INVENTORS
Louis J. Raver
Robert W. Campbell
BY
C. R. Meland
Their Attorney

INVENTORS
Louis J. Raver
BY Robert W. Campbell

C. R. Meland
Their Attorney

United States Patent Office 3,215,877
Patented Nov. 2, 1965

3,215,877
FLYWHEEL ALTERNATOR
Louis J. Raver and Robert W. Campbell, both of Anderson, Ind., assignors to General Motors Corporation, Detroit, Mich., a corporation of Delaware
Filed July 12, 1960, Ser. No. 42,254
3 Claims. (Cl. 310—168)

This invention relates to alternators and more particularly to a flywheel type of alternator wherein a rotor member is driven by an engine or other power source and rotates between a fixed stator assembly including a stator winding and a fixed field assembly including a field winding.

One of the objects of this invention is to provide an alternator that includes a fixed field assembly, a fixed stator assembly and a rotor member that is rotatable between the stator and field assemblies, the rotor member being comprised of two magnetic members which are formed of bar stock material and which are suported and maintained separated by a non-magnetic part.

Another object of this invention is to provide a rotor member for an alternator which is comprised entirely of bar stock material that is cut and formed to provide two magnetic members having interleaved fingers that are supported and maintained separated by a non-magnetic member.

A further object of this invention is to provide a method of manufacturing a rotor that is usable in an alternator, the steps comprising, providing a straight length of bar stock magnetic material, progressively notching away portions of said material to provide fingers extending in the same direction, cutting the notched material to length, bending the lengths of notched material into an annular shape, fixing two of the annular bent lengths of material in such a position that the fingers of one interleaves with the fingers of the other end and in contact with a non-magnetic part, and thence securing the annular lengths to the non-magnetic part.

Further objects and advantages of the present invention will be apparent from the following description, reference being had to the accompanying drawings wherein preferred embodiments of the present invention are clearly shown.

Figure 1:
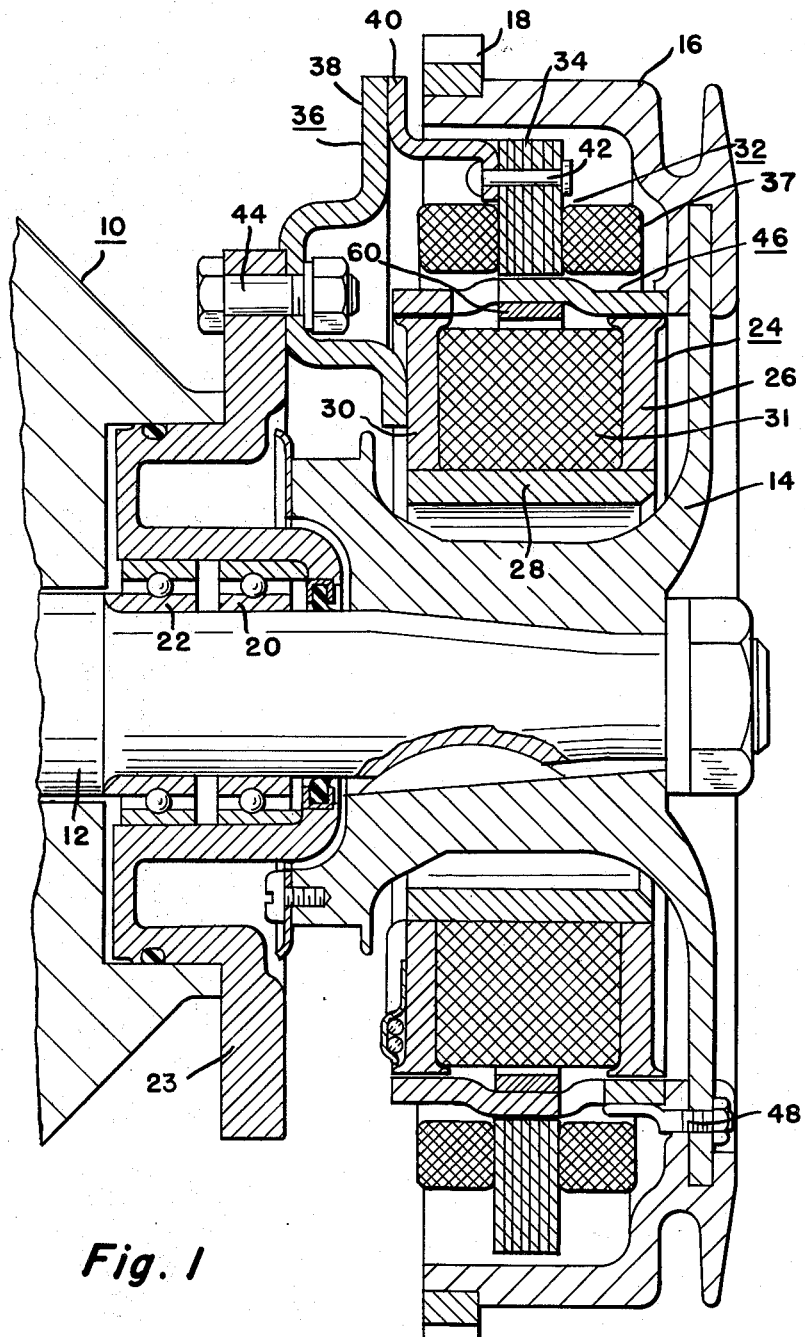
FIGURE 1 is a sectional view of an alternator made in accordance with this invention.

Referring now to the drawings and more particularly to FIGURE 1, reference numeral 10 generally designates a power source which may be, for example, an outboard marine engine having a shaft 12. The shaft 12 is connected with a hub member 14 which is in turn connected with a dome member generally designated by reference numeral 16. The dome member 16 may carry a ring gear 18 which is adapted to mesh with the pinion of a starting apparatus not illustrated. It is apparent that the hub 14 and dome member 16 may form a flywheel for the engine or power source 10. The shaft 12 is journalled for rotation in bearings 20 and 22 which are supported by a member 24 that is fixed to the housing of the power source or engine 10.

The alternator of this invention includes a field assembly generally designated by reference numeral 24 and including annular magnetic members 26, 28 and 30 which are suitably secured together as by welding and which preferably are formed of steel material. It can be seen that these members form an annular trough which contains the field winding 31.

The alternator further includes a stator assembly generally designated by reference numeral 32 including the stator iron 34 upon which is wound the stator or output winding 37. The stator iron is preferably formed of a stack of steel laminations and is held in place by a plurality of circumferentially spaced brackets 36, one of which is illustrated in the sectional view of FIGURE 1. Each bracket 36 includes a non-magnetic stainless steel member 38 and a steel member 40 which are welded together, the member 40 being held to the stator laminations 34 by rivets 42 which also serve to hold the laminations together. The member 36 is welded or otherwise secured to the part 30 of the field assembly 24 and it is seen that the support member 23 is secured to the member 36 by bolts 44.

It is apparent from the foregoing that the bracket members 36 serve to hold the field assembly 24 and the stator assembly 32 fixed with respect to the housing of the engine or power source 10. It has been found that four circumferentially spaced brackets 36 are sufficient to fix and support both the field assembly 24 and the stator assembly 32.

The rotor member for the A.C. generator is generally designated by reference numeral 46 in FIGURE 1 and it is seen that this rotor member has threaded studs 48 which are welded to the rotor member and which fit within openings formed in the hub member 14. This serves to secure the rotor member 46 to the hub member 14 and it is therefore apparent that the rotor member 46 will rotate with the shaft 12 and will also rotate between the field assembly 24 and the stator assembly 32.

Figure 2:
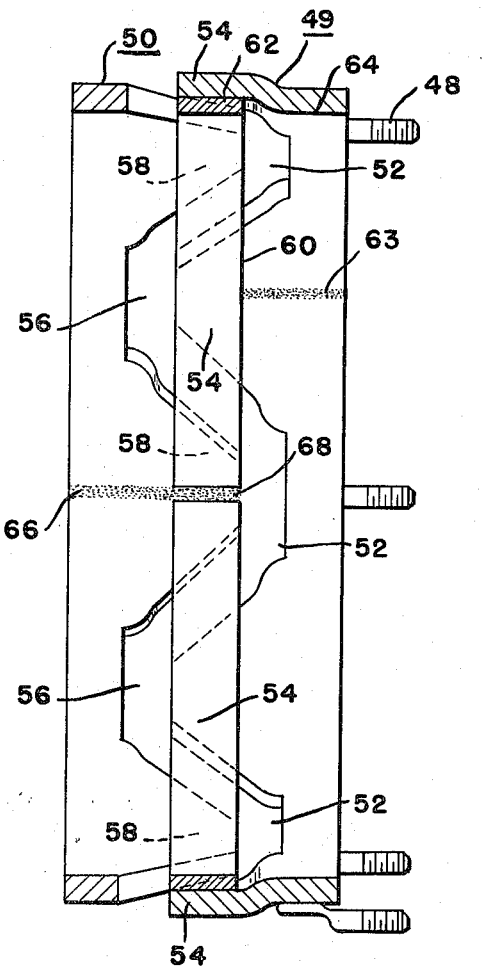
FIGURE 2 is a sectional view of a rotor that forms a part of the alternator illustrated in FIGURE 1.
Figure 3:
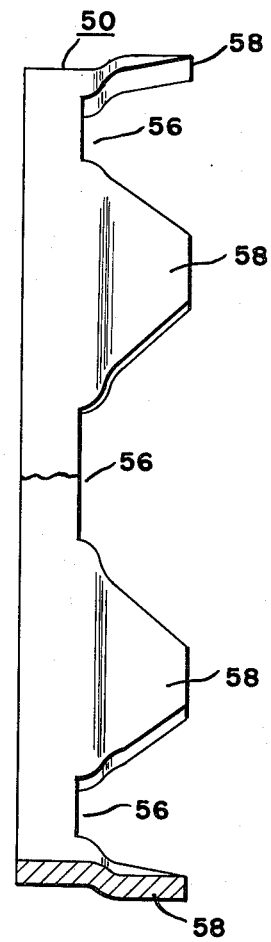
FIGURE 3 is a view partly in section and partly in elevation illustrating one of the magnetic parts that forms a portion of the rotor illustrated in FIGURE 2.

The rotor member 46 is shown in greater detail in FIGURE 2 and it is seen that this rotor member is formed of two annular shaped magnetic parts designated respectively by reference numerals 49 and 50. The magnetic part 49 carries the threaded studs 48 and it is seen that magnetic part 49 is formed with notches 52 defining circumferentially spaced fingers 54. The annular magnetic part 50 is likewise formed with alternate notched out portions 56 defining the circumferentially spaced fingers 58. The annular magnetic parts 49 and 50 are preferably formed of steel material and are welded to an annular ring of non-magnetic material such as stainless steel designated by reference numeral 60. It can be seen that the annular magnetic parts 49 and 50 are bent outwardly at the ends of their fingers providing the surface 62 which is positioned outwardly from the surface 64 of the magnetic part. The same is true of the magnetic part 50 and these outwardly bent portions provide an annular area for reception of the non-magnetic part 60 which may be formed of stainless steel material. It is also apparent that the fingers of the magnetic parts 49 and 50 interleave or in other words the fingers of one part fit within the notches in the other part.

The rotor of FIGURE 2 is constructed by a method which has considerable cost savings. Thus, in fabricating the rotor of FIGURE 2 a straight length of bar stock steel material is provided which may be run progressively through a machine that operates to notch away portions of the bar stock material to form the notches 56 and the fingers 58. During this progressive operation, the fingers are bent outwardly to provide the surface 62 that is located outwardly from the surface 64 on each magnetic member. Following this, the bar stock material is cut to length and is then bent into an annular shape. After being bent to an annular shape, the annular magnetic members are welded to form seams 63 and 66.

The non-magnetic member 60 which may be, for example, formed of stainless steel bar stock material is formed by cutting off lengths of this material and then bending these lengths to an annular shape. A small air gap designated by reference numeral 68 is provided located between the mating ends of non-magnetic member 60 when it is bent to its annular shape. This small air gap is provided to take up any deviation in tolerances or size when the non-magnetic member 60 is fitted to the magnetic members 49 and 50. It thus is apparent that if the magnetic members are slightly undersize, the air gap 68 will be reduced when the non-magnetic member 60 is fitted to the magnetic members 49 and 50.

When the magnetic members 49 and 50 have been cut and formed as described above and when the non-magnetic member 60 has likewise been cut and formed, they are ready for assembly. In assembling the three parts, the parts are positioned and held in a suitable fixture so that they take the position illustrated in FIGURE 2. The magnetic members 49 and 50 are then both welded to the non-magnetic member 60, the welds being located in the central portion of the fingers 58 on magnetic member 50 and fingers 54 on the magnetic member 49. The studs 48 may be welded to the magnetic member 49 prior to its assembly with the non-magnetic part 60 and the magnetic part 50 or may be welded thereto after the two magnetic parts and the non-magnetic part have been welded together.

In the operation of the alternator of this invention, when the field winding 31 is energized with direct current, an A.C. voltage will be induced in the stator winding 37 providing that the rotor member 46 is rotating. This is true since rotation of the rotor member 46 causes the flux to reverse in any given area of the stator winding 36 as the rotor member 46 rotates. It is apparent that the output taken off the stator winding 37 may be connected with suitable rectifiers to supply current for a battery on a boat or other motor vehicle and the other electrical loads of the vehicle.

It can be seen from the foregoing that an alternator has been provided which is compact in radial dimension and yet which is economical to manufacture. It also can be seen that this alternator is particularly adapted for use as a flywheel alternator wherein the rotor of the alternator forms a part of a flywheel of a power source such as an outboard engine.

While the embodiments of the present invention as herein disclosed constitute preferred forms, it is to be understood that other forms might be adopted.

What is claimed is as follows:

1. An alternating current generator comprising, a fixed field assembly including a field winding, a fixed stator assembly positioned outwardly from said field assembly and including a stator winding, and a rotor member rotatable between said fixed field assembly and said fixed stator assembly, said rotor member comprising two magnetic members formed of bar stock material having alternate circumferentially spaced notched-out portions defining interleaved fingers, said bar stock material having a uniform thickness throughout its length, said magnetic members being supported and maintained separated by a non-magnetic member which is secured to said fingers.

2. An alternating current generator comprising, a fixed field assembly including a field winding, a fixed stator assembly positioned outwardly from said field assembly and including a stator winding, a rotor member rotatable between said fixed field assembly and said fixed stator assembly, said rotor assembly comprising two magnetic parts formed of bar stock material having notched-out portions defining projecting fingers that interleave with each other, said bar stock material having a uniform thickness throughout its length, said fingers on said magnetic members having portions bent outwardly, and a non-magnetic member secured to said fingers along the area of the outwardly bent portions.

3. In combination, an engine having a housing and a rotatable shaft, a hub member secured to said shaft for rotation therewith, a fixed field assembly including a field winding, a stator assembly including a plurality of stator laminations carrying a stator winding, a plurality of circumferentially spaced brackets having portions secured to said field assembly and to said stator assembly for spacing said assemblies from each other, and said stator assembly being secured to said brackets by rivets which also serve to hold said stator laminations together, means securing said brackets to said engine housing, a rotor member rotatable between said field assembly and said stator assembly, said rotor member being comprised of two magnetic parts formed of bar stock material having notched out portions defining spaced interleaved fingers, said bar stock material having a uniform thickness throughout its length, and studs welded to said rotor assembly and secured to said hub member whereby said rotor member rotates with said hub member and shaft.

References Cited by the Examiner

UNITED STATES PATENTS

| | | | |
|---|---|---|---|
| 1,022,832 | 4/12 | Durbin | 310—153 |
| 2,071,953 | 2/37 | Schou | 310—168 |
| 2,248,167 | 7/41 | Elsey | 29—155.53 |
| 2,312,101 | 2/43 | Killam et al. | 310—263 |
| 2,384,489 | 9/45 | Pancher | 29—155.53 |
| 2,680,822 | 6/54 | Brainard | 310—261 |
| 2,721,280 | 10/55 | Dills | 310—86 |
| 2,795,715 | 6/57 | Gilchrist | 310—261 |
| 2,849,630 | 8/58 | Waloff et al. | 310—266 |
| 2,928,963 | 3/60 | Bertsche et al. | 310—168 |
| 3,134,039 | 5/64 | Bosch | 310—168 |

MILTON O. HIRSHFIELD, *Primary Examiner.*